United States Patent
Takatsuki

(10) Patent No.: US 6,385,684 B1
(45) Date of Patent: May 7, 2002

(54) INTELLIGENT PC ADD-IN BOARD

(75) Inventor: Takechiyo Takatsuki, Kanagawa-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/358,190

(22) Filed: Jul. 21, 1999

(30) Foreign Application Priority Data

Jul. 21, 1998 (JP) .......................................... 10-205412

(51) Int. Cl.[7] .............................................. G06F 13/00
(52) U.S. Cl. ...................................... 710/305; 710/301
(58) Field of Search ................................ 710/300–302, 710/305, 104; 709/200, 250; 439/43; 235/380

(56) References Cited

U.S. PATENT DOCUMENTS

| | | | | |
|---|---|---|---|---|
| 3,784,954 A | * | 1/1974 | Grimm et al. | |
| 4,428,043 A | * | 1/1984 | Catiller | |
| 4,777,355 A | * | 10/1988 | Takahira | |
| 5,608,876 A | * | 3/1997 | Cohen et al. | |
| 6,006,297 A | * | 12/1999 | Le Roux | |

* cited by examiner

Primary Examiner—Gopal C. Ray
(74) Attorney, Agent, or Firm—Brinks Hofer Gilson & Lione

(57) ABSTRACT

In view of attaining an intelligent PC add-in board which can respectively assure the program execution process and data transfer process at a high speed and can improve the processing rate by effectively conducting the data transfer process between the host system, external connecting device and data memory, the program memory and data memory are provided in different areas and the path with which the host system can make access to the data memory via the primary bus and the path with which the external connecting device can make access thereto via the secondary bus are also provided.

2 Claims, 3 Drawing Sheets

INTELLIGENT PC ADD-IN BOARD

BACKGROUND OF THE INVENTION

1. Field of the Invention

The present invention relates to an intelligent PC add-in board and particularly to such an intelligent PC add-in board to provide a high speed access to a program memory and a data memory via an access route such as a bus.

2. Description of Prior Art

As a board for adding the above-described desired function, for example, to form a disk array system by being mounted to a system bus on PC (personal computer) or server for connection with a disk in the host system or an external disk, an intelligent PC add-in board is in the Art. Such an intelligent PC add-in board comprises a firm CPU for alleviating load of the host CPU.

The existing intelligent PC add-in board 21 of the related art is provided, is disposed in the same physical area, with a program memory 22 which stores the desired programs, and a data memory 23 which stores various data through data transfer process between host system (not illustrated) and external connecting devices, as illustrated in FIG. 3. The program memory 22 is connected with the firm CPU for executing the control process conforming to such program using the CPU local bus 25 as the address path.

Moreover, the firm CPU 24 is connected with a connecting device controller 26 to interface with an external connecting device (such as a scanner and printer or the like) by controlling SCSI and LAN, IO, etc. depending on the control instruction of this firm CPU24 using the CPU local bus 25 as the address path. The SCSI controller 26a and LAN controller 26b or IO controller 26c may be used as the connecting device controller 26. These connecting device controllers 26 are also connected with the data memory 23 via the CPU local bus 25, to provide access thereto.

Moreover, the CPU local bus 25 is connected with a primary bus/CPU local bus controller 28 for controlling transmission and reception of data between buses. This primary bus /CPU local bus controller 28 is connected with the primary PCI bus 29. This primary PCI bus 29 can be connected with a host system (not illustrated) and these CPU local bus 25, primary bus/CPU local bus controller 28 and primary PCI bus 29 form the access path.

That is, the host CPU (not illustrated) of the host system, program memory 22 and data memory 23 are respectively connected and the program execution instruction for the firm CPU 24 and parameters or the like are transmitted to the program memory 22 from the host CPU and data transfer process is executed for the data memory 23. In addition, the host memory (not illustrated) of the host system and firm CPU 24 are connected and the firm CPU 24 can read the program execution instruction on the host memory.

According to the intelligent PC add-in board 21 of the related art explained above, when the host system issues the program execution instruction to the firm CPU 24, this program execution instruction is transferred to the CPU local bus 25 from the primary PCI bus 29 under the control of the primary bus/CPU local bus controller 28 and is then transmitted to the program memory 22. The program execution instruction is read by the firm CPU 24 to execute the program. Alternatively, the firm CPU 24 reads the program execution instruction on the host CPU to execute it depending on the access path of the CPU local bus 25, primary bus/CPU local bus controller 28 and primary PCI bus 29.

For example, when the program execution instruction for the firm CPU 24 is a command to control the SCSI controller 26a, etc., the firm CPU 24 provides access to the connecting device controller 26 via the CPU local bus 25 to generate the control instruction and thereby the connecting device controller 26 controls an external connecting device.

Moreover, when the host CPU of the host system provides data-access to the data memory 23, the data transfer is performed between the primary PCI bus 29 and CPU local bus 25 under the control of the primary bus/CPU local bus controller 28 in order to execute the process.

In addition, when the external connecting device provides data-access to the data memory 23, the data transfer process is performed with the data memory 23 via the connecting device controller 26 and CPU local bus 25.

As explained above, the intelligent PC add-in board 21 of the related art has shared a part of the role of host CPU and host memory of the host system to realize effective control process by receiving an instruction of the host system with the firm CPU 24 or executing, independent of such instruction, the program in the program memory 22 or storing, in the data memory 23, the access data transmitted and received between the host system and external connecting device.

However, the intelligent PC add-in board 21 of the related art has a problem that when the program process by the firm CPU 24 is overlapped in time with the data access process from the host system and external connecting device, each processing time is reduced. This results in slower processing rate because the program memory 22 and the data memory 23 exist in the same storing area from the physical viewpoint.

In addition, transmission and reception of data to the data memory 23 from the host system are conducted via the CPU local bus 25 from the primary PCI bus 29 and on the other hand, transmission and reception of data to the data memory 23 from the SCSI controllers 2/6a, etc. are conducted via the CPU local bus 25 and such transmission and reception are performed finally using the same CPU local bus Therefore, when data access is made at the same time to the data memory 23 from both elements, there problem arises that any one access is placed in the waiting condition. This results in bad processing efficiency.

Due to these problems explained above, a part of the processing time has been wasted uselessly, as illustrated in FIG. 4, because the program process by the firm CPU 24, data access process by the connecting device controller 26 and data access process by the host system have inevitably been placed in the waiting condition until the other processes are completed.

SUMMARY OF THE INVENTION

It is therefore an object of the present invention to provide an intelligent PC add-in board which enables respectively the program execution process and data transfer process at a high speed and also improves the processing rate by effectively conducting the data transfer process between the host system, external connecting device and data memory.

It is another object of the present invention that since the program memory and data memory are provided in different areas because the data memory is respectively provided with the path with which the host system provides access via the primary bus and the path with which the external connecting device provides access via the secondary bus. The program memory and data memory are separated and the program process for providing access to the program memory and the data transfer process for providing access to the data memory can be realized independently even if these are overlapped in the time. Thereby, a high speed process can be realized and two independent access paths to the data memory can also be established to assure effective and high speed response to respective data access.

It is further object of the present invention that the data memory controller for controlling access to the data memory from the primary bus and secondary bus comprises a buffer and additionally the primary bus controller has a buffer to tentatively store the access data between the data memory controller and primary bus and the secondary bus controller has a buffer to tentatively store the access data between the data memory controller and secondary bus. Even if the read/write access from the primary bus and the read/write access from the secondary bus are generated in the same time, each buffer can tentatively store the data at order to continue without any delay the data process in the host system and external connecting device in order to assure the effective and high speed response.

DETAILED DESCRIPTION OF THE PREFERRED EMBODIMENT

Figure 1:
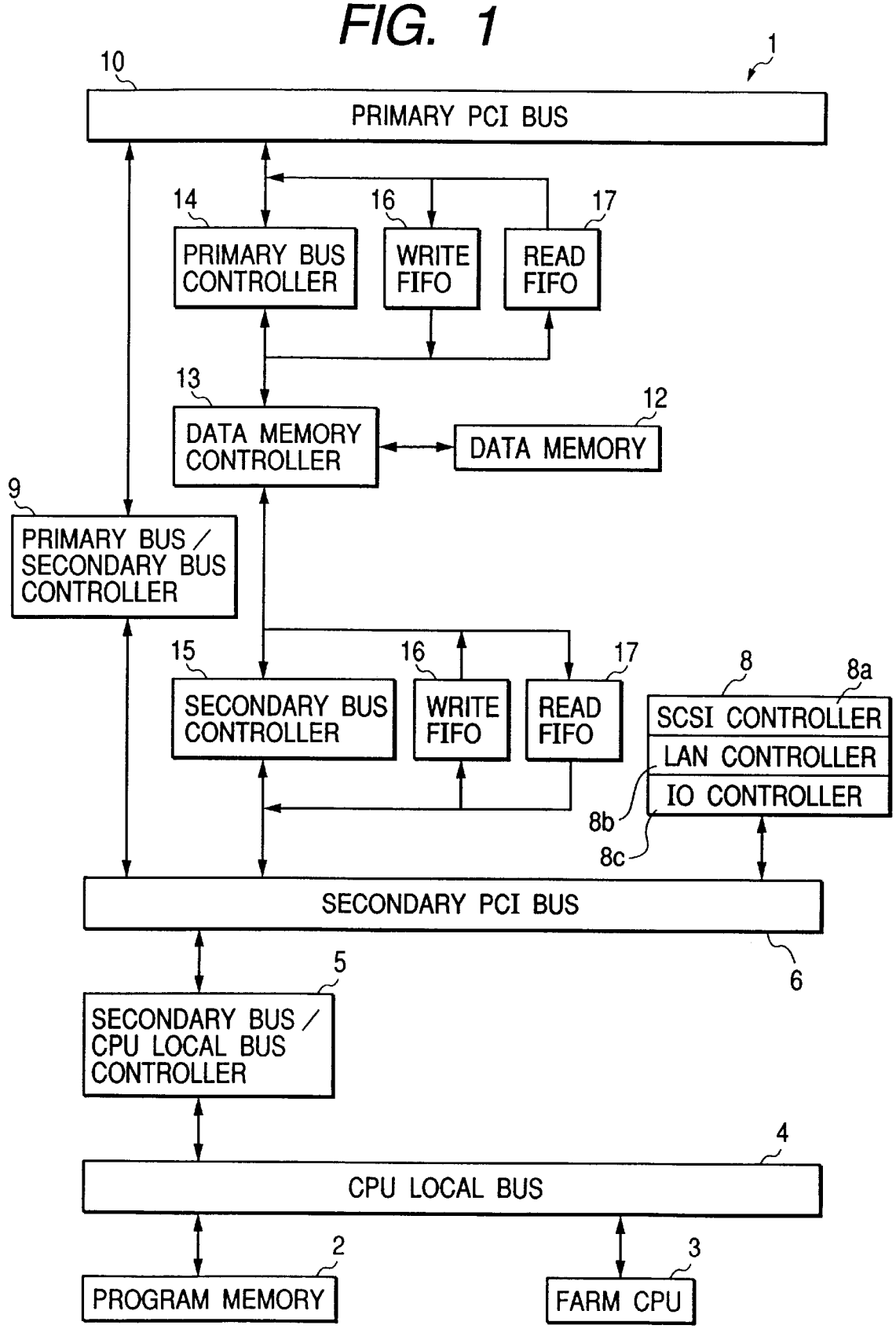
FIG. 1 is a block diagram illustrating an embodiment of the intelligent PC add-in board of the present invention.

As illustrated in FIG. 1, the intelligent PC add-in board of a preferred embodiment of the present invention has a program memory 2, which stores the desired program. This program memory 2 is connected with a firm CPU 3 to execute the arithmetic operations and control process depending on the program using a CPU local bus 4 as the address path. Moreover, the CPU local bus 4 is connected with a secondary PCI bus 6 under the control of a secondary bus/CPU local bus controller 5 for mutual transmission and reception of commands or the like. In addition, the secondary PCI bus 6 is connected with a connecting device controller 8 such as a SCSI controller 8a, a LAN controller 8b and an IO controller 8c, etc. to control SCSI, LAN and IO. This connecting device controller 8 executes the control process by receiving the control instructions of the firm CPU 3.

Furthermore, the secondary PCI bus 6 is connected with a primary PCI bus 10 under the control of a primary bus/secondary bus controller 9 for transmission and reception of commands and parameters between these elements. Since the primary PCI bus 10 can be connected with a host system (not illustrated), the host CPU and host memory (not illustrated) of the host system and the firm CPU 3 are connected via the access path of the primary PCI bus 10, primary bus/secondary bus controller 9, secondary bus PCI bus 6, secondary bus/CPU local bus controller 5 and CPU local bus 4 for transmission and reception of the program execution instruction, etc.

In the intelligent PC add-in board 1 of this embodiment, a data memory 12 for storing data by data transfer process with the host system and external connecting device is provided in a physically different area from the program memory 2 explained above. This data memory 12 is connected with a data memory controller 13 for controlling data read access and write access in order to control the access to the data memory 12 to or from which data is transmitted or received from or to the host CPU and external connecting device.

Moreover, the data memory controller 13 is connected with the primary PCI bus 10 under the control of a primary bus controller 14 and also with the secondary PCI bus 6 under the control of a secondary bus controller 15. Therefore, the host system is connected with the data memory 12 using the primary PCI bus 10, primary bus controller 14 and data memory controller 13 as the data access path, while the external connecting device is connected with the data memory 12 using the connecting device controller 8, secondary PCI bus 6, secondary bus controller 15 and data memory controller 13 as the data access path.

The primary PCI bus 10 is provided in combination with the other add-in board 1. In a PC environment, this primary PCI bus 10 is used for the purpose of transferring data read from a disk to the host memory via the primary PCI and then transmitting it to a graphic card from the host memory in order to display therefrom certain information on the display area. The data is also transmitted to a LAN card in order to transfer the data on the LAN.

Meanwhile, the secondary PCI bus 6 is separated from the primary PCI bus 10 and therefore particular control can be realized without lowering the traffic of the primary PCI bus 10.

In addition, the primary bus controller 14 and secondary bus controller 15 respectively comprise a write FIFO 16 and a read FIFO 17 as the data buffer of a plurality of stages in order to tentatively store the read data and write data transmitted and received via the primary PCI bus 10 and secondary PCI bus 6.

Therefore, even if the write access and read access from the primary PCI bus 10 and the write access and read access from the secondary PCI bus 6 are generated simultaneously, any one write/read access data is once stocked in the write FIFO 16 or read FIFO 17 and the other write/read access data is transmitted to the data memory controller 13 to provide access to the data memory 12.

Accordingly, the data transmission and reception processes of the host system and external connecting device can be realized at a high speed without any time lag.

Next, operation of this embodiment will be explained below.

In this embodiment, the firm CPU 3 provides access, at the time of executing a program, to the program memory 2 via the CPU local bus 4 and then reads the predetermined program and executes this program. If a particular program execution instruction is issued to the firm CPU 3 from the host system, this command is transmitted to the primary PCI bus 10 from the host CPU and is then transferred to the secondary PCI bus 6 under the control of the primary bus/secondary bus controller 9 and is then transferred to the CPU local bus 4 and then to the program memory 2 under the control of the secondary bus/CPU local bus controller 5. The firm CPU 3 reads the command on the program memory 2 and executes the relevant program.

Moreover, via the inverse flow of such access path, the firm CPU 3 is also capable of executing the program by reading the program execution instruction on the host memory.

For example, when the program contents are intended to execute the control for the external connecting device such as SCSI or the like, the firm CPU 3 issues the control execution instruction to the connecting device controller 8 such as the SCSI controller 8a or the like and transmits the command via the CPU local bus 4, secondary bus/CPU local bus controller 5, secondary PCI bus 6 and connecting device controller 8. Thus, the connecting device controller 8 controls the external connecting device.

On the other hand, when the host system performs the data transfer process to the data memory 12 via the primary PCI bus 10, data transmission and reception are conducted between the primary PCI bus 10 and the data memory 12 under the control of the primary bus controller 14 and the data memory controller 13.

Moreover, when the external connecting device performs data transfer process to the data memory 12 via the connecting device 8 such as the SCSI controller 8a, the LAN controller 8b, etc., data transmission and reception is conducted between the connecting device controller 8 and data memory 12 under the control of the secondary bus controller 15 and data memory controller 13.

If the access from the primary PCI bus 10 side (the host system side) and the access from the connecting device controller 8 side (external connecting device side) are made simultaneously to the data memory 12, the primary bus controller 14 and secondary bus controller 15 stock the access data to the write FIFO 16 when it is the write data or to the read FIFO 17 when it is the read data. Thereby, the process can be executed without any time lag by sequentially and effectively providing access to the data memory 12 depending on the control of the data memory controller 13.

For example, if read access is made from the primary PCI bus 10 side and write access from the connecting device controller 8 side, the data memory controller 13 reads data from the data memory 12 by receiving the read access and then sequentially stocks data to the read FIFO 17 of the primary bus controller 14. The read data stocked in the read FIFO 17 is then sequentially output to the primary PCI bus 10 and is then transferred to the host system side. During this period, the secondary bus controller 15 continuously input to the write FIFO 16 the write data from the connecting device controller 8 side for continuation the process. When the read access in the primary PCI bus 10 side is completed, the data memory controller 13 continuously reads the write data from the write FIFO 16 and then stores the write data to the data memory 12.

Moreover, if transfer rate of memory bus between the write FIFO 16, read FIFO 17 and data memory 12 is higher than that of the primary PCI bus 10 and secondary PCI bus 6, the next write access can be executed when the predetermined amount of data is input to the read FIFO 17.

Therefore, according to the embodiment of the present invention, since the program memory 2 and the data memory 12 are isolated and provided physically in the different areas, the program execution process and data write process can effectively conducted respectively at a higher speed.

Moreover, since the data access path to the data memory 12 is formed as a couple of paths from the primary PCI bus 10 and secondary PCI bus 6, the data processing rate can be remarkably improved.

In addition, since the primary bus controller 14 for controlling the primary PCI bus 10 and the secondary bus controller 15 for controlling the secondary PCI bus 6 are respectively connected with the write FIFO 16 and read FIFO 17 as the data buffers, even when the write access or read access is generated simultaneously via each path, the process will never be delayed and high speed data access can be realized.

Figure 2:
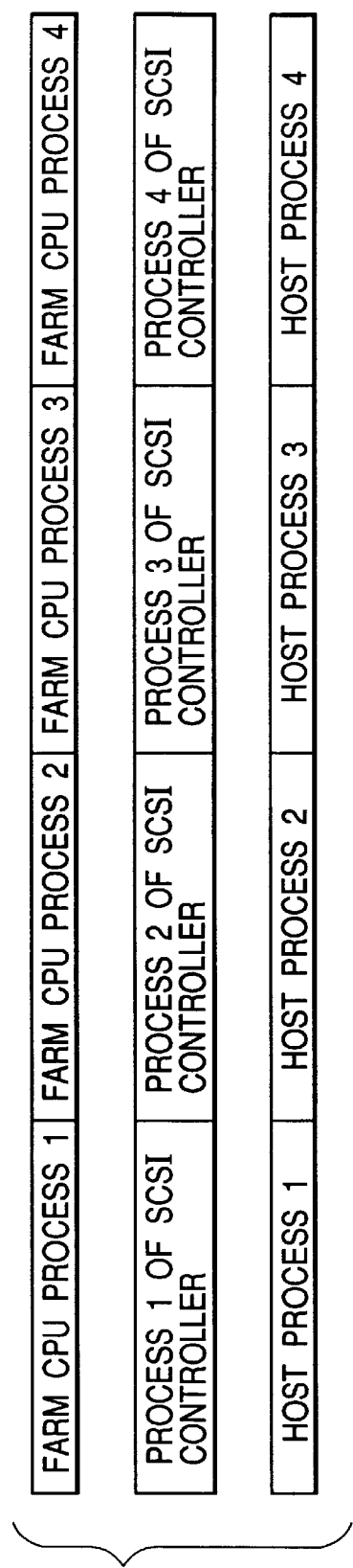
FIG. 2 is a diagram illustrating a timing chart of each process of each controller and host system connected to the firm CPU and external connecting device in the embodiment.
Figure 4:
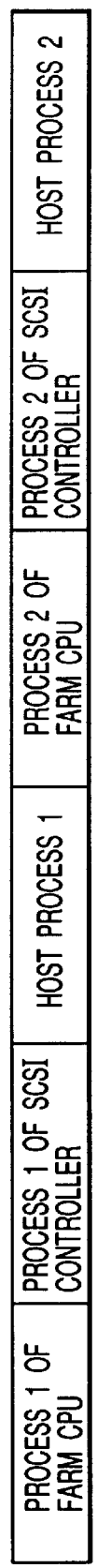
FIG. 4 is a diagram illustrating a timing chart of each process of each controller and host system connected to the CPU and external connecting device in the intelligent PC add-in board of the related art.
Figure 3:
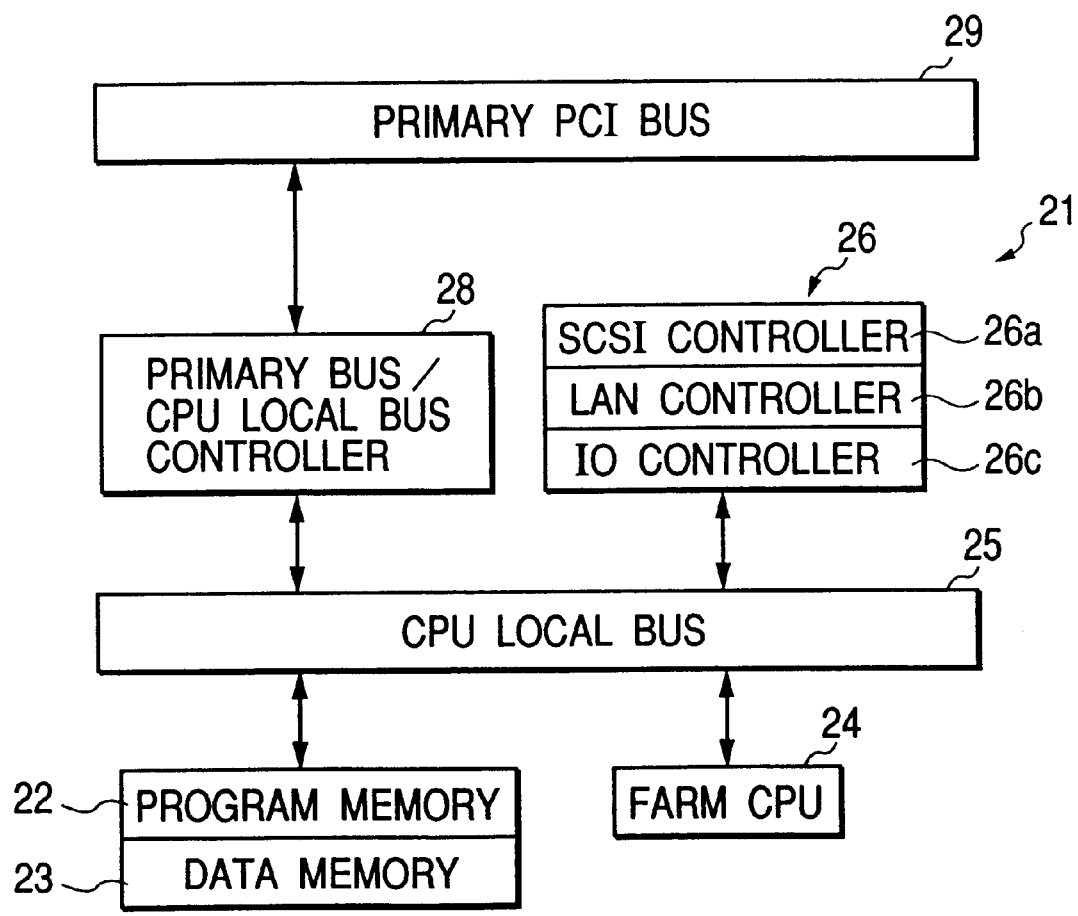
FIG. 3 is a block diagram illustrating the intelligent PC add-in board of the related art

Therefore, as illustrated in FIG. 2, since the intelligent PC add-in board of this embodiment can execute independently the program process of the firm CPU 3, data access process from the external connecting device and access process from the host system, the processing rate can be improved by as much as about three times the rate of each process of the intelligent PC add-in board of the related art.

The present invention is not limited only to the embodiment explained above and allows various changes or modifications as required.

As explained above, according to the intelligent PC add-in board of the present invention, since if the program process for providing access to the program memory and data transfer process for providing access to the data memory are issued simultaneously, these processes may be executed individually and therefore each process can be made effectively at a high speed and moreover since two independent access paths are established to the data memory, high speed response can be realized for these accesses.

Moreover, according to the intelligent PC add-in board, in addition to the effect of the invention described above, even if the data read/write access from the primary bus is generated simultaneously with the data read/write access from the secondary bus, since such data can be stored in the buffer, the memory access can be executed effectively through the high speed response without resulting in any time lag of the data read/write process.

What is claimed is:

1. An intelligent PC add-in board comprising:
a program memory storing desired programs; and
a data memory storing various data,
wherein a firm CPU for executing the programs is connected to said program memory, an execution instruction transmitting and receiving path to transmit and receive the program execution instruction of a host system and a control instruction transmitting and receiving path to transmit and receive the control instruction for controlling an external connecting device are connected to the firm CPU, and an access path for transmitting access data of the host system and the external connecting device is connected to said data memory,
said program memory and data memory being provided in different areas, and said data memory being provided with the path with which the host system provides access via the primary bus and the path with which the external connecting device makes access via the secondary bus.

2. An intelligent PC add-in board according to claim 1, comprising: a data memory controller for controlling the access to said data memory from said primary bus and said secondary bus; a primary bus controller having a buffer for tentatively storing access data between said data memory controller and said primary bus; and a secondary bus controller having a buffer for tentatively storing access data between said data memory controller and said secondary bus.

* * * * *